(12) United States Patent
Waheed et al.

(10) Patent No.: US 10,153,804 B2
(45) Date of Patent: Dec. 11, 2018

(54) CLEAR CHANNEL ASSESSMENT

(71) Applicant: FREESCALE SEMICONDUCTOR, INC., Austin, TX (US)

(72) Inventors: Khurram Waheed, Austin, TX (US); Kevin Traylor, Austin, TX (US); Mihai-Ionut Stanciu, Bucharest (RO)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 15/224,891

(22) Filed: Aug. 1, 2016

(65) Prior Publication Data
US 2017/0366221 A1    Dec. 21, 2017

(30) Foreign Application Priority Data
Jun. 17, 2016   (RO) .................... 16/00440

(51) Int. Cl.
| | | |
|---|---|---|
| H04B 1/00 | (2006.01) | |
| H04B 1/7097 | (2011.01) | |
| H04B 1/7075 | (2011.01) | |
| H04B 1/709 | (2011.01) | |

(52) U.S. Cl.
CPC ........... *H04B 1/7097* (2013.01); *H04B 1/709* (2013.01); *H04B 1/70752* (2013.01); *H04B 2201/709709* (2013.01)

(58) Field of Classification Search
CPC ............... H04B 1/7097; H04B 1/709; H04B 2201/709709; H04B 1/707; H04B 1/7075; H04B 1/7093; H04B 2201/70703; H04J 13/10; H04J 13/00; H04J 13/0022
USPC ........ 375/142, 141, 140, 130, 316, 219, 195
See application file for complete search history.

(56) References Cited

U.S. PATENT DOCUMENTS

| | | | |
|---|---|---|---|
| 7,869,380 B2 | 1/2011 | Jeon et al. | |
| 8,892,143 B2 | 11/2014 | Hsu | |
| 8,897,280 B2 | 11/2014 | Husted et al. | |
| 2002/0018520 A1* | 2/2002 | Eidson ................ | H04W 48/20 375/150 |
| 2003/0043947 A1 | 3/2003 | Zehavi et al. | |
| 2004/0030530 A1* | 2/2004 | Li .......................... | C30B 25/18 702/179 |
| 2004/0258138 A1* | 12/2004 | Oishi .................. | H04B 1/7075 375/142 |
| 2008/0095215 A1* | 4/2008 | McDermott ....... | H04B 1/70735 375/146 |

(Continued)

OTHER PUBLICATIONS

Pollin, Sofie et al; "Performance Analysis of Slotted Carrier Sense IEEE 802.15.4 Medium Access Layer"; IEEE Transactions on Wireless Communications, vol. 7, No. 9; pp. 3359-3371 (Sep. 2008).

(Continued)

*Primary Examiner* — Zewdu A Kassa (57) ABSTRACT

Circuits and methods concerning signal detection are disclosed. In some example embodiments, an apparatus is configured to detect presence of a spreading sequence in a sample data sequence. Phase differences between samples in a sample sequence are determined. Presence of a spreading sequence in the sample sequence is detected by evaluating correlation of reference sub-sequences, of a reference spreading sequence, to the phase differences between samples in a sample sequence. Each of the reference sub-sequences includes fewer chips than the spreading sequence to be detected.

19 Claims, 4 Drawing Sheets

(56) References Cited

U.S. PATENT DOCUMENTS

| | | | |
|---|---|---|---|
| 2008/0117955 A1* | 5/2008 | Stafford | H04B 1/70752 |
| | | | 375/149 |
| 2009/0232051 A1 | 9/2009 | Swarts et al. | |
| 2012/0026994 A1* | 2/2012 | Agarwal | H04L 27/2647 |
| | | | 370/338 |
| 2013/0202014 A1* | 8/2013 | Schmidl | H04B 1/707 |
| | | | 375/147 |

OTHER PUBLICATIONS

Singh, C.K., et al.; "Performance Evaluation of an IEEE 802.15.4 Sensor Network with a Star Topology"; Wireless Networks (Springer), vol. 14, No. 4; 21 pages (Aug. 2008).

* cited by examiner

CLEAR CHANNEL ASSESSMENT

CROSS-REFERENCE TO RELATED APPLICATIONS

This application claims the priority under 35 U.S.C. § 119 of European patent application no. A/00440, filed Jun. 17, 2016 the contents of which are incorporated by reference herein.

Various exemplary embodiments disclosed herein relate generally to communication of data using direct sequence spread spectrum (DSSS). Various communications systems use direct sequence spread spectrum modulation to transmit data between a transmitter and a receiver. Spread spectrum systems use a pseudo-noise signal to carry information. At a transmitter, a data signal is encoded with a spreading sequence (e.g., a pseudo-noise (PN)) sequence to spread the spectrum of the signal for transmitting the data. By spreading the signal across a wider frequency spectrum interference by noise present at particular frequencies. At a receiver, the data is recovered from the media and then decoded using the same spreading sequence to de-spread the spectrum of the signal to reproduce the original digital data stream. These and other matters may present challenges to efficiencies of data communications, for a variety of applications.

SUMMARY

Various example embodiments are directed to issues such as those addressed above and/or others which may become apparent from the following disclosure concerning clear channel assessment. Certain example embodiments involve detecting presence of data signals encoded using direct sequence spread spectrum.

In one example embodiment, phase differences between samples in a sample sequence are determined. Presence of a spreading sequence in the sample sequence is detected by evaluating correlation of sub-sequences of a reference spreading sequence to phase differences in a sample sequence. Each of the sub-sequences includes fewer chips than the spreading sequence to be detected. For ease of reference, a sub-sequence of the reference spreading sequence may be referred to as a reference sub-sequence.

In another example embodiment, an apparatus is configured to detect presence of a spreading sequence in a sample data sequence. The apparatus includes a phase differentiation circuit configured to determined phase differences between samples in a sample sequence. The apparatus also includes a detection circuit configured to detect presence of a spreading sequence in the sample sequence by evaluating correlation of a set of reference sub-sequences to the determined phase differences. At least one of the reference sub-sequences includes fewer chips than the spreading sequence to be detected.

In a more specific example embodiment, the detection circuit includes a correlation assessment circuit and a channel state assessment circuit. The correlation assessment circuit is configured to determine an output for each of the plurality of reference sub-sequences, a respective level of correlation between the reference sub-sequences to phase differences in the sample sequence. The channel state assessment circuit is configured to detect presence of the N chip spreading sequence in the sample sequence based on the respective levels of correlation output by the correlation assessment circuit.

In a more specific example embodiment, a respective level of correlation is determined by the correlation assessment circuit for each of a plurality of reference sub-sequences. In detecting presence of the spreading sequence by the channel state assessment circuit, the highest one of the determined levels of correlation is determined and compared to a first threshold. In some embodiments, a respective highest level of correlation is determined for multiple sub-sequences of the spreading sequence. Signal detection is determined based on a number of the sub-sequences for which the highest level of correlation exceeded the threshold level. For instance, if the number is greater than a second threshold, spread spectrum spreading sequence is detected in the communication channel. Otherwise, the communication channel is considered to be clear.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems, and methods involving spread spectrum communication. In certain implementations, aspects of the present disclosure have been shown to be beneficial when used in the context of communication systems utilizing clear channel assessment to control access to a transmission medium. Clear channel assessment is used in some communications systems such as wireless personal area networks (WPANs) and local area networks (WLANs), where access mechanisms such as Carrier Sense Multiple Access/Collision Detect are used to control access to the wireless medium. In some systems, signals are detected based on energy levels of signals sampled in a communication channel. However, energy based detection methods may be unable to distinguish energy of spread spectrum signals from background noise and interfering signals. Some example embodiments are additionally or alternatively configured to detect presence of spread spectrum signals based on characteristics of spreading sequences. While not necessarily so limited, various aspects may be appreciated through the following discussion of non-limiting examples which use exemplary contexts.

In one example embodiment, an apparatus is configured to detect presence of a spreading sequence in a sample data sequence. Phase differences between samples in a sample sequence are determined. Presence of a spreading sequence in the sample sequence is detected by evaluating correlation of reference sub-sequences to phase differences in a sample sequence. Each of the reference sub-sequences includes values correlating with a contiguous subset chips in the spreading sequence. For instance, for a generic N-bit spreading sequence [c0, c1, c2 . . . cn−1], each reference sub-sequence includes M values, such that M<N, correlating with M contiguous chips of the N-bit spreading sequence. Evaluation of correlation with shorter reference sub-sequences allows signal detection to be performed using fewer samples of a communication channel that that needed to evaluate correlation of a complete spreading sequence. Evaluating a set of smaller correlations using fewer samples for each may allow channel assessment to be carried out with mathematically fewer computations—thereby increasing efficiency.

As the correlation with a longer reference spreading sequence is realized by a combination of a set of shorter reference sequence correlations, a method has been developed to estimate presence of a reference spreading sequence more quickly than performing a full spreading sequence correlation. By reducing the time needed to detect presence of a spreading sequence, a device may obtain control of the communication channel more quickly and reduce the probability of collision with a data transmission of another device.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

In a more specific example embodiment, a respective level of correlation is determined for each of a plurality of reference sub-sequences. The highest one of the determined levels of correlation is determined and compared to a first threshold. In some embodiments, a respective highest level of correlation is determined for multiple sub-sequences of the sample sequence. Signal detection is determined based on a number of the sub-sequences for which the highest level of correlation exceeded the threshold level. For instance, if the number is greater than a second threshold, spread spectrum spreading sequence is detected in the communication channel. Otherwise, the communication channel is considered to be clear.

It is recognized that some constant signals, such as pilot tones, may exhibit a strong level of correlation with one or more of the reference sub-sequences and may be incorrectly detected as a spread-spectrum signals. In some embodiments, a detection circuit is configured to distinguish constant signals from spread-spectrum signals and avoid false detection of spread-spectrum signals. For instance, due to the pseudo-noise characteristics of spreading sequences, there is a high probability that different portions of the sample sequence will most strongly correlate with different ones of the reference sub-sequences. In some implementations, a detection process is configured to evaluate correlation for a number of different sub-sequences in the sample sequence and track a number of instances that the reference sub-sequence determined to have the highest level of correlation is the same as that determined for the previous sub-sequence. The tracked number of instances may be compared to a threshold number to determine if a detected signal is a spread spectrum signal or a constant signal.

In some embodiments, communication channel may be oversampled at a rate that collects multiple samples in a measurement period having a duration equal to one chip of a spreading sequence. For ease of reference, the position of the samples in the measurement period may be referred to as an oversample index. For a sample sequence including X samples in the measurement period, samples for a particular oversample index are separated from each other by X−1 samples in the sample sequence. For ease of reference, samples in the sample sequence having the same oversample index may be collectively referred to as an oversample index sequence.

Oversampling may allow correlation of the reference sub-sequences to be evaluated without first synchronizing a sampling circuit of the phase of the spreading sequence. If a sampling circuit is not synchronized with the spreading sequence, the circuit may sample values near edges of chips in the spreading sequence, which are prone to sampling error. Oversampling increases the probability that samples for one of the oversample index sequences will be positioned away from edges in the spreading sequence.

In some embodiments, the detection circuit may be configured to separately process each oversample index sequence to evaluate correlation with the reference sub-sequences. The oversample index sequence that is best aligned with the chips of the spreading sequence will exhibit the highest level of correlation. The detection circuit may use the oversample index sequence having the highest level of correlation to determine whether or not a direct sequence spread-spectrum (DSSS) signal is present. In this manner, synchronization processes prior to sampling may be avoided and time required for channel assessment may be reduced. Accordingly, a device to obtain control of the communication channel more quickly and the probability of collision with transmission of another device may be reduced as previously described.

Use of higher oversampling rates increase the probability that samples for one of the oversample index sequences will be positioned away from edges in the spreading sequence. Oversampling by a factor of 2 should be sufficient for many applications. However, some embodiments may use a higher oversampling factor or may not use any oversampling.

Various embodiments may be adapted for clear channel assessment in various types of communication system that use direct sequence spread spectrum sequences including, for example, systems using IEEE standard 802.15.4 spread spectrum PHYs (e.g., O-QPSK PHY used by Zigbee, Thread, Z-wave, etc.) or IEEE 802.11x. The number of chips used in spreading sequences and/or referenced sequences may differ for different application and communication protocol. The number, length, and values of reference sub-sequences differ depending on the length, values, and type of the spreading sequences used for spectrum spreading in a particular application. For ease of explanation, the examples may be primarily described with reference to an application configured to communicate at 2450 MHz using IEEE 802.15.4 Offset Quadrature Phase Shift Keying (O-QPSK) PHY.

For 2450 MHz communication, IEEE 802.15.4 O-QPSK PHY encodes each 4-bit symbol of a data transmission with a spreading sequence having 32 chips. The spreading sequence is rotated a certain number of chips after encoding each 4-bit symbol. In some embodiments, the 32 chip spreading sequence may be detected based on correlation with a set of number of smaller 4 chip reference sub-sequences. As an illustrative example, each chip in the 4 chip reference sub-sequences may have a first phase $\pi/2$ (e.g., corresponding to a chip value of 1) or a second phase $-\pi/2$ (e.g., corresponding to a chip value of 0). With each chip in the 4 chip reference sub-sequences having a binary value $\pi/2$ or $-\pi/2$, there are 16 different 4 chip reference sub-sequences. However, it is recognized that each reference sub-sequence may be used to evaluate correlation of the inverse of the reference sub-sequence. For instance, the reference sub-sequence $\{\pi/2, \pi/2, \pi/2, \pi/2\}$ will exhibit the same correlation as the reference sub-sequence $\{-\pi/2, -\pi/2, -\pi/2, -\pi/2\}$. Table 1 shows a set of 8 reference sub-sequences that may be used to evaluate correlation of each of the 16 possible reference sub-sequences with samples of a sample sequence.

TABLE 1

| Reference sub-sequence | C[0] | C[1] | C[2] | C[3] |
|---|---|---|---|---|
| 0 | $\pi/2$ | $\pi/2$ | $\pi/2$ | $\pi/2$ |
| 1 | $-\pi/2$ | $\pi/2$ | $\pi/2$ | $\pi/2$ |
| 2 | $\pi/2$ | $-\pi/2$ | $\pi/2$ | $\pi/2$ |
| 3 | $-\pi/2$ | $-\pi/2$ | $\pi/2$ | $\pi/2$ |
| 4 | $\pi/2$ | $\pi/2$ | $-\pi/2$ | $\pi/2$ |
| 5 | $-\pi/2$ | $\pi/2$ | $-\pi/2$ | $\pi/2$ |
| 6 | $\pi/2$ | $-\pi/2$ | $-\pi/2$ | $\pi/2$ |
| 7 | $-\pi/2$ | $-\pi/2$ | $-\pi/2$ | $\pi/2$ |

It has been discovered that the probability that reference sub-sequences correlate to a sample sequence may differ by a significant amount. In some implementations, the detection circuit is configured to use a subset of the reference sub-sequences that have the highest probability of correlation. Generally, for an M-chip reference set of sub-sequences having $2^M$ possible reference sub-sequences, the subset includes less than $$\frac{2^M}{2}$$

reference sub-sequences.

Evaluating correlation with the smaller subset of reference sub-sequences reduces the number of correlation assessments and reduces the processing time required for clear channel assessment. As previously discussed, in some instances, constant signals (e.g., pilot tones and/or wireless power charging signals) may be falsely detected as spreading sequences. In some embodiments, the subset may be additionally or alternatively selected to omit references sub-sequences having a higher probability of false detection of pilot tones as spreading sequences.

Figure 1:
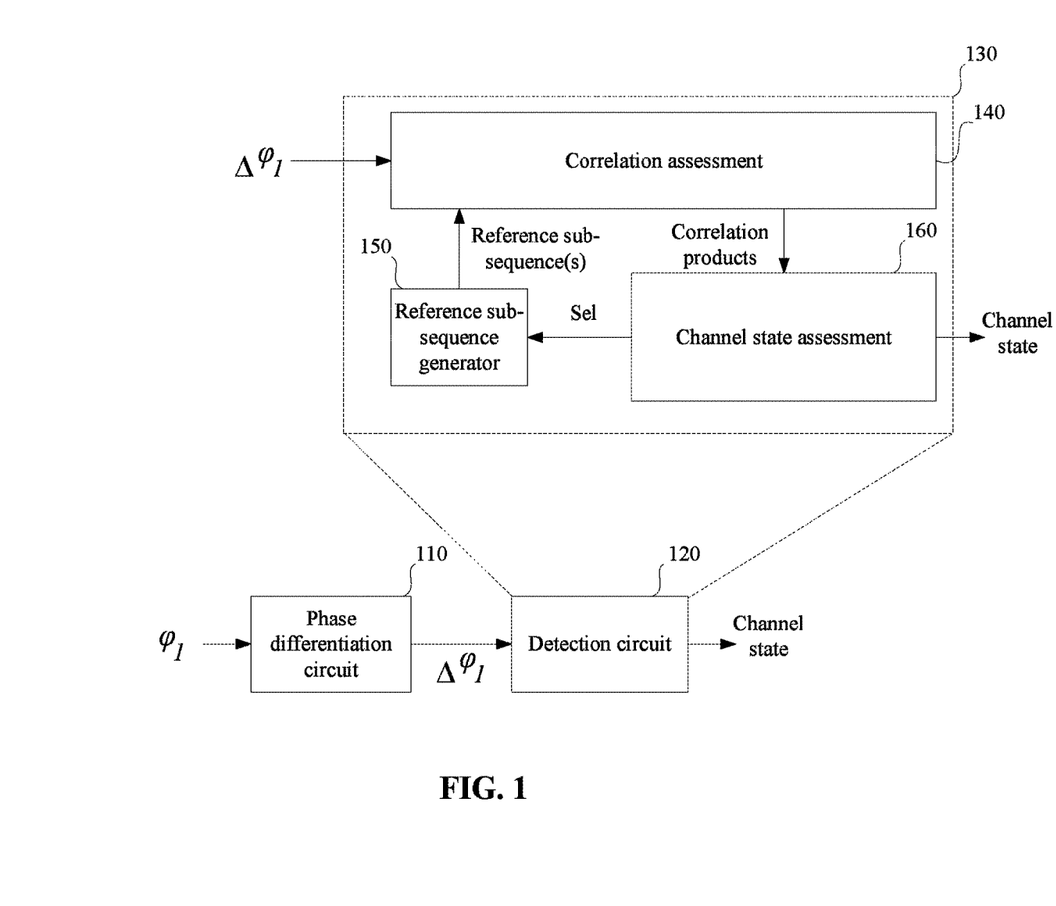
FIG. 1 shows a block diagram of a circuit for sensing spread spectrum signals, in accordance with one or more embodiment.

Turning now to the figures, FIG. 1 shows a block diagram of a circuit for sensing spread spectrum signals, in accordance with one or more embodiment. In this example, the circuit includes a phase differentiation circuit 110 configured to determine phase differences between sequential samples in a sample sequence $\varphi_1$. The phase differentiation circuit 110 outputs the determined phase differences as a sequence $\Delta^{\varphi}_1$. For ease of reference, the sequence of phase differences may be referred to as a phase differentiated sequence. A detection circuit 120 is configured to detect presence of a spread spectrum sequence in the sample sequence $\varphi_1$ by evaluating levels of correlation between the phase differentiated sequence $\Delta^{\varphi}_1$ and a number of reference sub-sequences. The reference sub-sequences include fewer chips than the spreading sequence to be detected. The detection circuit 120 determines a state of the channel based on the determine levels of correlation.

The detection circuit 120 may employ various processes and circuit arrangements to evaluate correlation and determine channel state. Block 130 shows an example circuit arrangement that may be used to implement the detection circuit 120 in one or more embodiments. In this example, the circuit arrangement 130 includes a correlation circuit 140 configured to evaluate levels of correlation between a buffered segment of the phase differentiated sequence and an input reference sub-sequence. The circuit arrangement 130 also includes a reference sub-sequence generation circuit 150 configured to output a reference sub-sequence specified by a selection control signal. The channel state assessment circuit 160 is configured to control correlation circuit 140 and reference sub-sequences generator 150 to cause the correlation circuit 140 to evaluate correlation of the buffered segment to a plurality of reference sub-sequences generated by the reference sub-sequences generator 150. Based on the determined levels of correlation, the channel state assessment circuit determines a state of the communication channel from which the sample sequence $\varphi_1$ was sampled.

Figure 2:
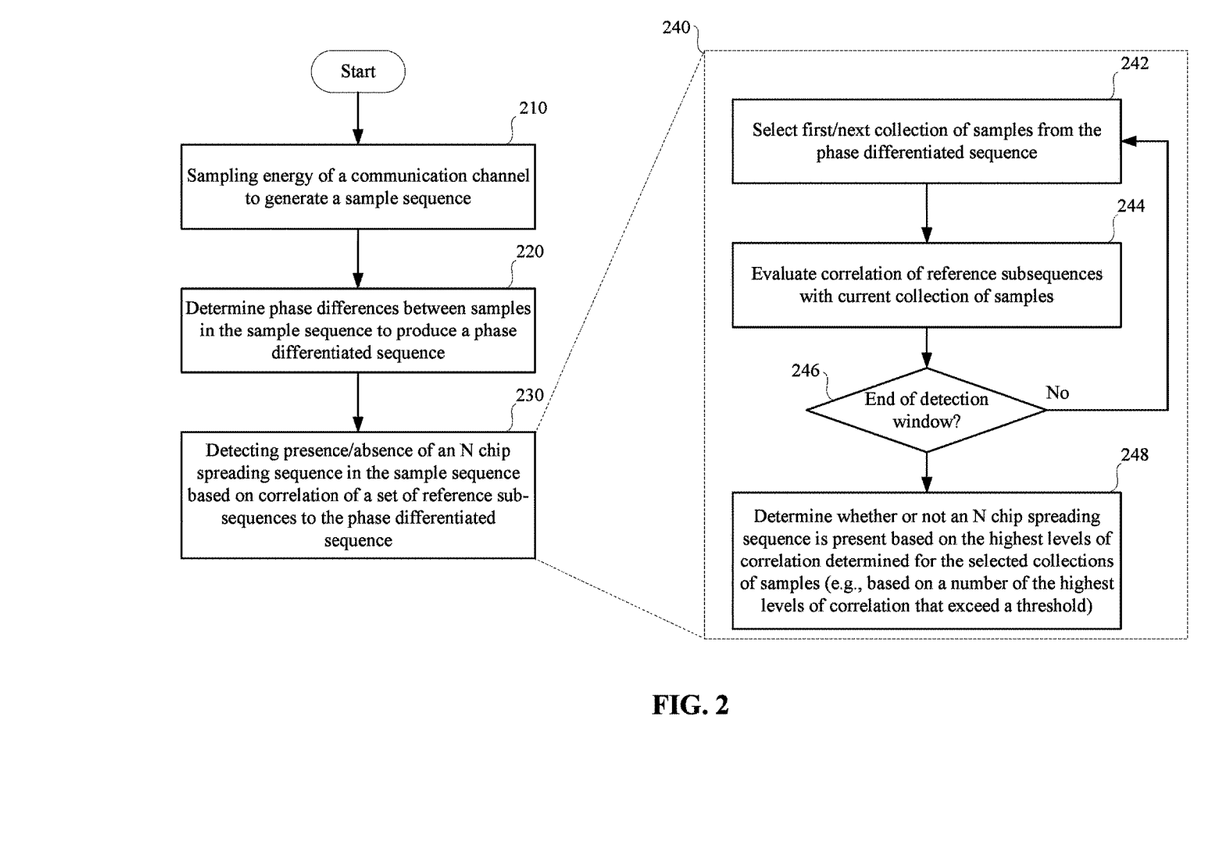
FIG. 2 shows a process for sensing spread spectrum signals, in accordance with one or more embodiment.

FIG. 2 shows a process for sensing spread spectrum signals, in accordance with one or more embodiments. At block 210, energy of a communication channel is sampled to generate a sample sequence. At block 220, phase differences between samples in the sample sequence are determined (e.g., by phase differentiation circuit 110) to produce a phase differentiated sequence. At block 230, presence of an N chip spreading sequence is detected (e.g., using detection circuit 120) based on correlation of a set of reference sub-sequences, having less than N chips, to the phase differentiated sequence. Detection of a spreading sequence at block 230 may be performed using various different processes. In an example process, a respective level of correlation is determined for each of a plurality of reference sub-sequences. The highest one of the determined levels of correlation is determined and compared to threshold correlation level to determine whether or not the level of correlation is indicative of a transmission using spread spectrum communication.

In some embodiments, evaluation of correlation may be repeated for several different portions of the sample sequence. Presence of the spreading sequence may be detected based on the number of the evaluated portions for which the highest level of correlation exceeds the threshold level of correlation. The number may be compared to a threshold number to determine whether or not a spreading sequence is present in the sample sequence.

Block 240 shows an example process for detecting presence of an N chip spreading sequence based on correlation with the set of reference sub-sequences. At block 242, a first collection of samples from the phase differentiated sequence is selected. At block 244, the selected collection of samples is evaluated to determine respective levels of correlation of the set of reference sub-sequences with the selected collection of samples. If the detection window is not expired, the process proceeds from decision block 246 back to block 242, where a next collation of samples is collected. Selection of samples and evaluation is repeated until the end of the detection window is reached. At the end of the detection window, the process determines whether or not the spreading sequence is detected based on the highest level of correlation determined for each of the select collections of samples. For example, detection of the spreading sequence may be based on the number of instances that the determined highest levels of correlation exceeds a threshold level of correlation.

Figure 3:
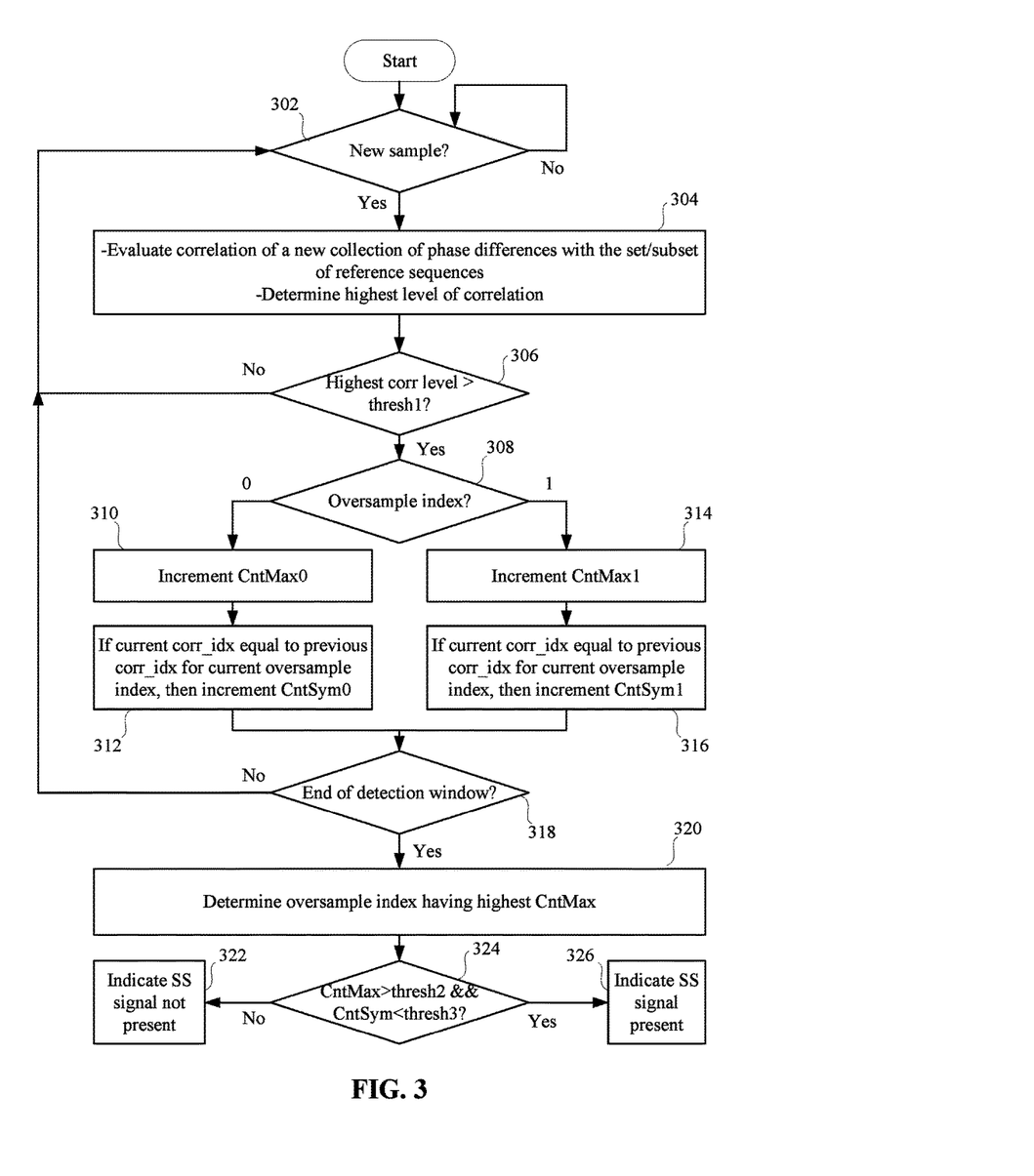
FIG. 3 shows a process for sensing spread spectrum signals, in accordance with one or more embodiment.

FIG. 3 shows a process for detecting presence of a spreading sequence based on correlation of phase differences with a set of reference sub-sequences. In response to receiving a new sample at decision block 302, levels of correlation are determined at block 304 between a new collation of samples in the sample sequence and set of reference sub-sequences. The highest of the levels of correlation is also determined at block 304.

In this example, presence or absence of the spreading sequence is detected based on a number of samples in a detection window for which the highest of the level of correlation exceeds a first threshold (thresh1). If the highest level of correlation is less than thresh1, at decision block 306, the process proceeds back to decision block 302 and waits for the next sample.

If the highest level of correlation is greater than thresh1, a first counter CntMax is incremented to track the number of times the highest level of correlation exceeds thresh1. A separate CntMax counter is tracked for each oversample index. In this example, the process is described with reference to a sample sequence including two oversample indexes. If the oversample index of the current collection of samples is 0, the process is directed from decision block 308 to block 310, where counter CntMax0 is incremented. If the oversample index of the current collection of samples is 1, the process is directed from decision block 308 to block 314, where counter CntMax1 is incremented.

As previously discussed, some constant signals, such as pilot tones, may exhibit a strong level of correlation with one or more of the reference sub-sequences and may be incorrectly detected as a spread-spectrum signals. In this example, the process distinguishes constant signals from spread-spectrum signals by tracking the number of instances in which the reference sub-sequence is determined to have the highest level of correlation is the same as that determined for the previous collection of samples having the same oversample index. At blocks 312 and 316, a respective second counter CntSym0 or CntSym1 is incremented if the reference sub-sequence having highest level of correlation is the same as that determined for the previous collection of samples for the respective oversample index.

The evaluation of correlation and adjustment of counters is repeated as new samples are received at block 302 until a detection window ends at decision block 318. After the detection window ends, the oversample index having the highest first counter CntMax is selected at block 320.

As previously described, sampling samples from multiple oversample indexes in each measurement period increases the probability that sample for at least one index will be adequately aligned away from edges of the chips in the spreading sequence. The samples of the oversample index having the highest first counter are best aligned with the chips of the spreading sequence. By maintaining respective CntMax and CntSym counters for each oversample index and selecting the oversample index with CntMax indicating the highest overall correlation, samples may be captured by a sampling circuit without first aligning a sampling clock with chips of the spreading sequence.

CntMax and CntSym counters of the determined oversample index are used to determine whether or not a spread spectrum signal is present. A value of the CntMax counter that is less than a second threshold thresh2 is indicative of a spreading sequence not being present. A value of the CntSym counter that is greater than a third threshold thresh3 is indicative of a present signal is a constant signal (e.g., a pilot tone) rather than a spread spectrum signal. If the CntMax counter is less than thresh 2 or if the CntSym counter is greater than thresh3 at decision block 324, the process indicates that a spread spectrum signal is not present at block 322. Otherwise, the process indicates that a spread spectrum signal is present at block 326.

Figure 4:
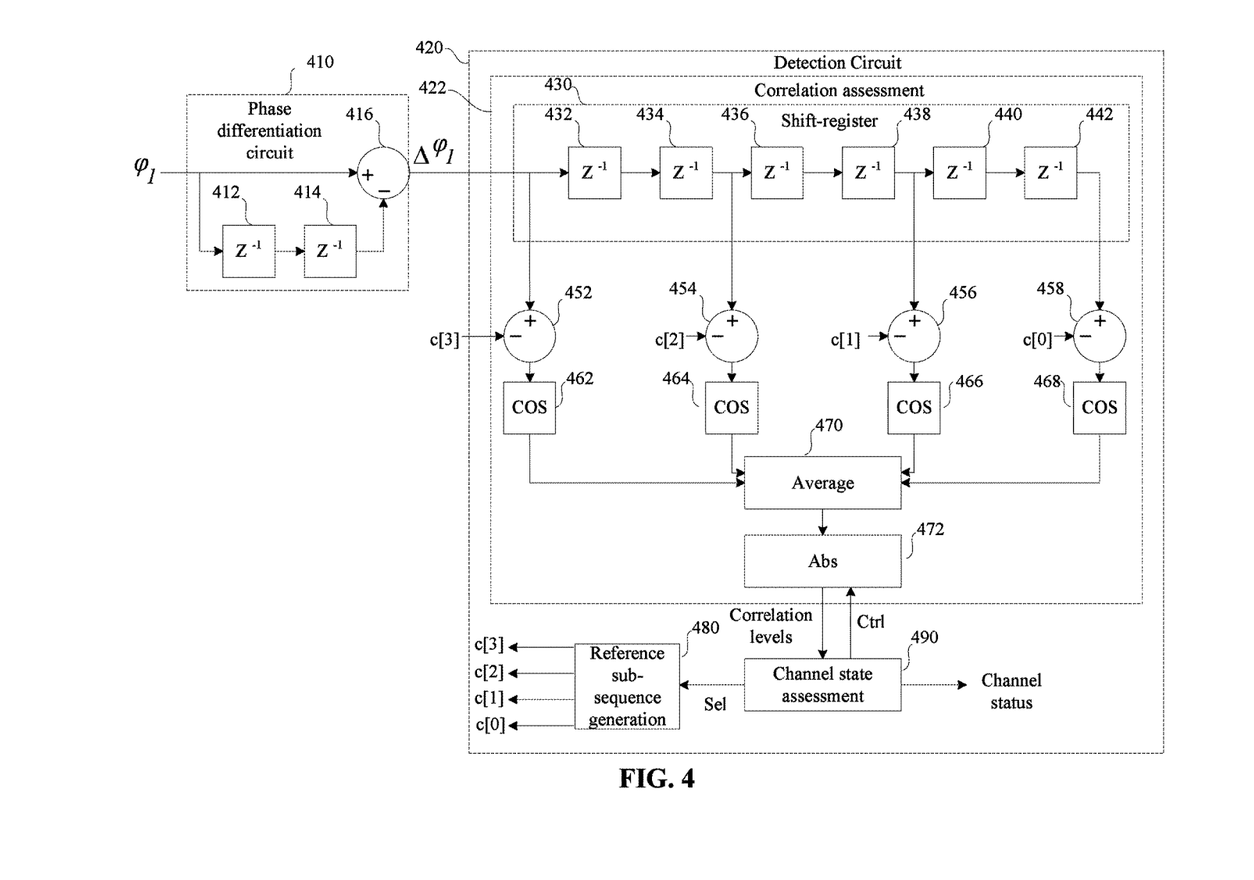
FIG. 4 shows a block diagram of a circuit for sensing spread spectrum signals, in accordance with one or more embodiment.

FIG. 4 shows a block diagram of a circuit for sensing spread spectrum signals, in accordance with one or more embodiments. The circuit includes a phase differentiation circuit 410 configured to output a phase differentiated sequence $\Delta^{\varphi}_1$ indicating phase differences between sequential samples in a sample sequence $^{\varphi}_1$ as described with reference to phase differentiation circuit 110 in FIG. 1. The circuit also includes a detection circuit configured to detect spreading sequences based on correlation of a set of reference sub-sequences with the phase differentiated sequence $\Delta^{\varphi}_1$ as described with reference to phase detection circuit 120 in FIG. 1.

As previously discussed, in some embodiments, a sample sequence may oversample multiple samples in the measurement period of each chip of a spreading sequence. In this example, the phase differentiation circuit 410 and detection circuit 420 are configured to process a sample sequence that is oversampled by a factor of 2. The phase differentiation circuit 410 and detection circuit 420 separately process samples of each oversample index for evaluating correlation with a set of reference sub-sequences.

In this example, the phase differentiation circuit 410 includes a first-in-first-out buffer including a number of registers 412 and 414 sufficient to buffer the number samples oversampled in the measurement period. For each sample of the sequence input to the phase differentiation circuit 410, circuit 416 determines a phase difference between the sample and the previous sample of the same oversample index, which is stored in the last register 414 of the FIFO buffer.

The detection circuit 420 includes a correlation assessment circuit 422, a reference sub-sequences generation circuit 480, a channel state assessment circuit 490 configured to operate as described with reference to the correlation assessment circuit 140, a reference sub-sequences generation circuit 150, a channel state assessment circuit 160 in FIG. 1. In this example, the correlation assessment circuit 422 includes a number of registers 432, 434, 436, 438, 440, and 442 arranged to form a multi-tap shift register 430. The shift register 430 is configured to receive and buffer the phase differentiated sequence $\Delta^{\varphi}_1$. The shift register 430 includes a number of taps spaced to output phase differences of the phase differentiated sequence $\Delta^{\varphi}_1$ corresponding to the same oversample index. For each new sample, the buffered phase difference values are shifted to the next register to the right in the shift register 430. The shift register includes a number of taps configured to output buffered values of the phase differentiated sequence $\Delta^\varphi{}_1$ corresponding to the same oversample index. The number of registers between each tap is equal to the number of oversampled in the measurement period.

The correlation assessment circuit 422 includes a number of subtraction circuits 452, 454, 456, and 458 are configured to subtract a values C[0], C[1], C[2], and C[3] of the reference sub-sequence from the phase difference values output from the shift register 130 for the current oversample index. Circuits 462, 464, 466, and 468 determine cosine of the output of the subtraction circuits. Higher magnitude cosine values indicate that the phase difference values of the phase differentiated sequence $\Delta^\varphi{}_1$ for the same oversample index more strongly correlate with the reference phase sequence. Circuit 470 determines an average of the cosine values. Absolute value sequence 472 determines an absolute value of the average cosine value to provide a level of correlation.

The channel state assessment circuit 490 is configured to determine whether or not a spreading sequence is present in the sample sequence $^\varphi{}_1$ based on the levels of correlation provided by the absolute value circuit 472. The channel state assessment circuit 490 may determine whether or not a spreading sequence, for example, using the process shown in FIG. 3 or the processes described with reference to channel state assessment circuit 160 shown in FIG. 1. For each new sample received, a new phase difference is determined by phase differentiation circuit 410, and phase difference values in shift register 430 are shifted to the right.

Under control of channel state assessment circuit 490, the correlation assessment circuit 422 and reference sub-sequences generation circuit 480 sequentially evaluates correlation with each reference sub-sequence of a set or subset of reference sub-sequences with the subset of phase differences output by the taps of the shift-register 430. As described with reference to channel state assessment circuit 160, the channel state assessment circuit 490 may determine the highest level of correlation with the subset of phase differences. After evaluating correlation with the set or subset of reference sub-sequences, the next sample is input to the phase differentiation circuit 410 and phase difference values are shifted again to the right in the shift register 430. The channel state assessment circuit 490 may determine the state of the sampled channel (e.g., spread spectrum transmission present/absent) based on the highest levels of correlation determines for one or more subset of the phase differences.

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as blocks, modules, device, system, unit, controller, and/or other circuit-type depictions. Such circuits or circuitry are used together with other elements to exemplify how certain embodiments may be carried out in the form or structures, steps, functions, operations, activities, etc. For example, in certain of the above-discussed embodiments, one or more modules are discrete logic circuits or programmable logic circuits configured and arranged for implementing these operations/activities, as may be carried out in the approaches shown in, for example, FIGS. 2 and 3. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process (e.g., as described in FIGS. 2 and 3) is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the Specification may make reference to a "first [type of structure]", a "second [type of structure]", etc., where the [type of structure] might be replaced with terms such as ["circuit", "circuitry" and others], the adjectives "first" and "second" are not used to connote any description of the structure or to provide any substantive meaning; rather, such adjectives are merely used for English-language antecedence to differentiate one such similarly-named structure from another similarly-named structure (e.g., "first circuit configured to convert . . . " is interpreted as "circuit configured to convert . . . ").

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not depart from the true spirit and scope of various aspects of the disclosure, including aspects set forth in the claims.

What is claimed is:

1. A method comprising: determining phase differences between samples in a sample sequence; and detecting presence of a spreading sequence in the sample sequence by: evaluating correlation of each of a plurality of reference sub-sequences, of a reference spreading sequence, to the phase differences; and determining a reference sub-sequence among the plurality of reference subsequences for the sample sequence that exceeds a threshold level of correlation between the reference sub-sequences and the phase differences, wherein for a given N-bit spreading sequence, each of the plurality of reference sub-sequences includes M values, such that M<N, and correlating with M contiguous chips of the N-bit spreading sequence at least one of the reference sub sequences has fewer chips than the spreading sequence, wherein the evaluating of the correlation of the plurality of sub-sequences includes determining, for each of the plurality of reference sub-sequences, the respective level of correlation between the reference sub-sequence and the phase differences, wherein the reference sequence include values correlating with a contiguous subset of chips in the spreading sequence, and determining the reference sub-sequence of the plurality of reference sub-sequences for the sample sequence having a highest one of the determined levels of correlation.

2. The method of claim 1, wherein
the sample sequence includes, for each chip of the spreading sequence in the sample sequence, a sample for a first oversample index and a sample for a second oversample index;
the determining of the phase differences includes determining phase differences between samples of the sample sequences having the same oversample index; and the evaluating of the correlation of the plurality of reference sub-sequences includes, for a plurality of sample sub-sequences of the sample sequence,
for each of the first and second oversample indexes,
determining a respective reference sub-sequence of the plurality of reference sub-sequences having a highest level of correlation with the phase differences between the samples having the oversample index in the sub-sequence, and
in response to the level of correlation of the determined reference sub-sequence exceeding a first threshold value, incrementing a respective first counter for the oversample index.

3. The method of claim 2, further comprising generating a signal indicative of presence of the spreading sequence in response to the highest one of the respective first counters being greater than a second threshold value.

4. The method of claim 2, further comprising
for each of the oversample indexes, incrementing a respective second counter in response to the reference sub-sequence having the highest level of correlation for a sample having the oversample index in first one of the sub-sequences being the same as the reference sub-sequence having the highest level of correlation for a samples having the oversample index in the next one of the sub-sequences of the sample sequence; and
generating a signal indicative of presence of the spreading sequence in response to the highest one of the respective first counters being greater than a second threshold value and the second counter being less than a third threshold value.

5. The method of claim 1, further including
using a reference sub-sequence generation circuit to output the plurality of reference sub-sequences in response to a selection control signal, and
for each of a set of the plurality of reference sub-sequences, determining a probability that a reference sub-sequence in the set has a highest level of correlation with the phase differences of the set of reference sub-sequences; and
selecting a subset of the set of reference sub-sequences having the highest of the determined probabilities among the set.

6. The method of claim 1, further comprising generating the sample sequence by sampling energy in a transmission channel at a rate that measures X samples per chip of the spreading sequence, wherein X>1.

7. The method of claim 6, wherein:
each of the reference sub-sequences has M chips;
the evaluating of the correlation of the plurality of reference sub-sequences includes evaluating a level of correlation of the plurality of reference sub-sequences includes for each of a plurality of different subsets of sample; and
each of the plurality of different subsets of samples includes M samples separated from one another by X-1 samples in the phase differences.

8. An apparatus, comprising: a detection circuit configured and arranged to detect presence of a spreading sequence in a sample sequence by evaluating a level of correlation of a plurality of reference sub-sequences, of a reference spreading sequence, to phase differences in the sample sequence, wherein for a given N-bit spreading sequence, each of the plurality of reference sub-sequences includes M values, such that M<N, and correlating with M contiguous chips of the N-bit spreading sequence at least one reference sub sequence has less chips than the spreading sequence, wherein the detection circuit includes a correlation assessment circuit configured and arranged to determine and output, for each of the plurality of reference sub-sequences, a respective level of correlation between the reference sub-sequence to phase differences in the sample sequence, and a channel state assessment circuit configured and arranged to detect presence of the spreading sequence in the sample sequence based on the respective levels of correlation output by the correlation assessment circuit.

9. The apparatus of claim 8, further including a reference sub-sequence generation circuit configured to output the plurality of reference sub-sequences in response to a selection control signal, and wherein the correlation assessment circuit includes a shift register having an input configured to receive the sampled phase differences.

10. The apparatus of claim 8, wherein the sample sequence includes,
for each chip of the spreading sequence in the sample sequence, respective samples for a plurality of oversamples indexes; and
wherein the detection circuit is configured and arranged to, for a plurality of sample sub-sequences of the sample sequence,
for each of the plurality of oversample indexes,
determine a reference sub-sequence of the plurality of reference sub-sequences having a highest level of correlation with the phase differences between the samples having the oversample index in the sub-sequence, and
in response to the level of correlation of the determined reference sub-sequence exceeding a first threshold value, incrementing a respective first counter for the oversample index.

11. The apparatus of claim 10, wherein the detection circuit is further configured and arranged to, for each of the oversample indexes, increment a respective second counter in response to the one of the reference sub-sequences having the highest level of correlation for a first one of the sub-sequences and for a second one of the sub-sequences.

12. The apparatus of claim 11, wherein the detection circuit is configured and arranged to
select the oversample index having the highest of the respective first counters; and
generate a signal indicative of presence of the spreading sequence in response to the first counters for the selected oversample index than a second threshold value and the second counter for the selected oversample index being less than a third threshold value, such that the spreading sequence is detected in a communication channel responsive to a number of sub-sequences having the highest level of correlation exceeding the first threshold value being greater than the second threshold value.

13. The apparatus of claim 8, wherein a generation circuit is configured and arranged to output a reference sub-sequence of the plurality of reference sub-sequences in response to a selection signal output by the detection circuit indicating the reference sub-sequence.

14. The apparatus of claim 13, wherein the detection circuit is further configured and arranged to:
for each of a set of reference sub-sequences, determining a probability that a reference sub-sequence has a highest of the levels of correlation;
selecting a subset of the set of reference sub-sequences having a highest of the determined probabilities; and
setting the selection signal to values indicative of reference sub-sequences in the selected subset.

15. The apparatus of claim 14, wherein each reference sub-sequence has M chips, and the selected subset includes less than ($2^M/2$) reference sub-sequences.

16. The apparatus of claim 8, further comprising:
a sampling circuit configured and arranged to sample energy of a communication channel to generate the sample sequence; and
a phase differentiation circuit connected to the sampling circuit and detection circuit and configured and arranged to output phase differences between samples in the sample sequence.

17. The apparatus of claim 16, wherein the sampling circuit is configured and arranged to sample energy in the communication channel at a rate that measures X samples per chip of the spreading sequence, wherein X>1.

18. The apparatus of claim 17, wherein the phase differentiation circuit is configured to output phase differences between samples separated from one another by X-1 samples in the sample sequence.

19. A method comprising:
determining phase differences between samples in a sample sequence; and
detecting presence of a spreading sequence in the sample sequence by:
evaluating correlation of each of a plurality of reference sub-sequences, of a reference spreading sequence, to the phase differences; and
determining a reference sub-sequence among the plurality of reference sub-sequences for the sample sequence that exceeds a threshold level of correlation between the reference sub-sequences and the phase differences, and wherein
the sample sequence includes, for each chip of the spreading sequence in the sample sequence, a sample for a first oversample index and a sample for a second oversample index;
the determining of the phase differences includes determining phase differences between samples of the sample sequences having the same oversample index;
the evaluating of the correlation of the plurality of reference sub-sequences includes, for a plurality of sample sub-sequences of the sample sequence,
for each of the first and second oversample indexes,
determining a respective reference sub-sequence of the plurality of reference sub-sequences having a highest level of correlation with the phase differences between the samples having the oversample index in the sub-sequence;
for each of the oversample indexes, incrementing a respective second counter in response to the reference sub-sequence having the highest level of correlation for a sample having the oversample index in first one of the sub-sequences being the same as the reference sub-sequence having the highest level of correlation for a samples having the oversample index in the next one of the sub-sequences of the sample sequence; and
generating a signal indicative of presence of the spreading sequence in response to the highest one of the respective first counters being greater than a second threshold value and the second counter being less than a third threshold value.

* * * * *